(12) United States Patent
Froeschl et al.

(10) Patent No.: US 6,260,535 B1
(45) Date of Patent: Jul. 17, 2001

(54) METHOD AND SYSTEM FOR THE CONTROLLED SHUTTING-OFF OF AN INTERNAL-COMBUSTION ENGINE

(75) Inventors: Joachim Froeschl, Herrsching; Ulrich Schlachetzki, Munich, both of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/436,758

(22) Filed: Nov. 9, 1999

(30) Foreign Application Priority Data

Nov. 12, 1998 (DE) ............................... 198 52 228

(51) Int. Cl.$^7$ ................................................... F02B 77/00
(52) U.S. Cl. .................................................... 123/198 DB
(58) Field of Search ..................................... 123/198 DB

(56) References Cited

U.S. PATENT DOCUMENTS 5,730,098 * 3/1998 Sasaki et al. ................. 123/198 DB

* cited by examiner

Primary Examiner—Tony M. Argenbright
Assistant Examiner—Katrina B. Harris
(74) Attorney, Agent, or Firm—Crowell & Moring, L.L.P.

(57) ABSTRACT

A method and a system are disclosed for the controlled shutting-off of an internal-combustion engine. The engine system includes a fuel injection timing gear, an ignition control, an electric machine in the form of an electric motor and/or generator coupled directly or indirectly with the internal-combustion engine, and another control unit. In order to ensure a controlled shutting-off the control unit is operable to detect a shut-off signal for the internal-combustion engine, to interrupt the fuel injection while the ignition is simultaneously maintained, to maintain a defined rotational engine speed for a defined time or a defined number of crankshaft revolutions by means of the electric machine, and finally to stop the internal-combustion engine by means of the electric machine.

16 Claims, 1 Drawing Sheet

METHOD AND SYSTEM FOR THE CONTROLLED SHUTTING-OFF OF AN INTERNAL-COMBUSTION ENGINE

This application claims the priority of German application 198 52 228.2, filed Nov.12, 1998, the disclosure of which is expressly incorporated by reference herein.

BACKGROUND AND SUMMARY OF THE INVENTION

The invention relates to a method and a system for the controlled shutting-off of an internal-combustion engine which has a fuel injecting timing gear and an ignition control, and an electric machine in the form of one of a motor and a generator which is coupled directly or indirectly with the internal-combustion engine.

Conventionally, when an ignition key is turned into the "ignition-off" position, the injection and/or the ignition of an engine is switched off. This prevents a further combustion and the engine runs out corresponding to its moment of inertia.

However, in the case of such a shut-off operation, the problem arises that unburnt gasoline-air mixture still remains in the combustion space or the intake system. When the engine is started again, this effect results in poor emission values. With a view to future emissions laws, it is required to eliminate the unburnt gasoline-air fractions before the start of an engine.

This may take place in that the timing gear switches off the injection after the "ignition-off" signal but continues to trigger the ignition. However, because of the residual gas quantities which must then still be burnt, the engine will then run out in an undefined manner. This is called an "afterdieseling".

It is an object of the invention to ensure the removal of unburnt gas quantities in the engine while its running-out behavior is defined.

With respect to the method and to the system, this object is achieved by a system operable to carry out the following steps: detecting a shut-off signal for the internal-combustion engine, interrupting the fuel injection while simultaneously maintaining the ignition in response to the shut-off signal, maintaining a defined rotational engine speed for a defined time period or a defined number of crankshaft revolutions after the shut-off signal by means of the electric machine, and subsequently stopping the internal-combustion engine by means of the electric machine.

An important idea of the invention is the fact that, also after the ignition-off signal, the internal-combustion engine continues to be operated for a defined time period with a defined revolution and a switched-on ignition control. Since, according to the invention, the fuel injection is switched off in this time period, the unburnt gas quantities still situated in the intake system and the combustion space are burnt without residues. After the burning of the residual unburnt gas quantities, a rapid stopping of the internal-combustion engine is caused by acting upon the internal-combustion engine by means of the electric machine. A combined starter-generator arrangement, such as a crankshaft starter generator, is particularly suitable for use as the electric machine (starter, generator).

Other objects, advantages and novel features of the present invention will become apparent from the following detailed description of the invention when considered in conjunction with the accompanying drawings.

DETAILED DESCRIPTION OF THE DRAWINGS

The present embodiment represents a simple variant and should not be understood as a limitation of the invention.

Figure 1:
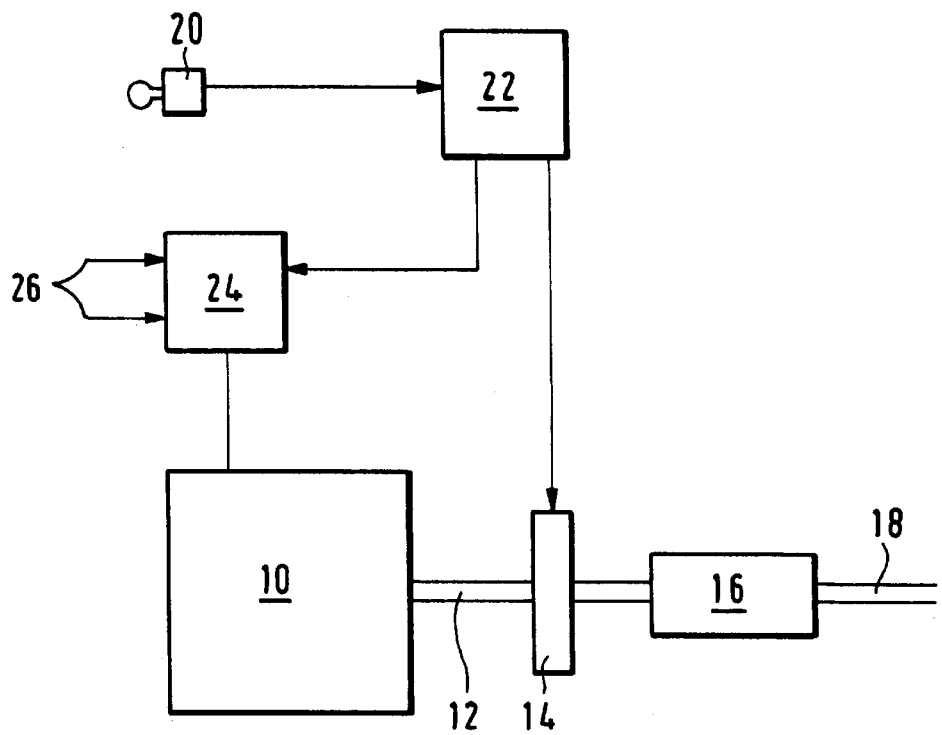
FIG. 1 is a schematic block diagram of a system according to the invention for the controlled shutting-off of an internal-combustion engine.

The illustrated embodiment according to FIG. 1 shows an internal-combustion engine 10 which transmits the torque generated by it by way of an output shaft 12 to a transmission 16 which follows. In the present case, a combined starter—generator 14 is arranged on the output shaft 12.

This combined starter—generator may also be arranged at a different point in the case of the internal-combustion engine, for example, directly on the crankshaft. As an alternative, electric motors can be used which are indirectly coupled with the internal-combustion engine. However, a more or less rigid connection between the selected electric machine and the internal-combustion engine 10 is a prerequisite.

The drive shaft continues to the transmission 16 which provides by way of an output shaft 18 the power generated by the internal-combustion engine 10 to the driving wheels (not shown).

The internal-combustion engine is controlled by a timing gear 24 which determines the injection as well as the ignition. The timing gear receives many different input signals which are schematically illustrated by the arrows having the reference number 26.

In addition, another control 22 is provided which, among other devices, is connected with the ignition switch 20 and thus receives a signal as to whether the ignition is switched on or off. The control 22 is connected with the engine timing gear 24 and the starter—generator arrangement 14.

In the following, the method of operation of the system according to the invention will be described.

First, the ignition switch 20 is switched to "on" and normal engine operations take place. When the ignition switch 20 is finally switched to "off", this is registered by the control 22, and the control 22 acts upon the engine timing gear 24 such that the latter immediately interrupts the fuel injection but continues to trigger the ignition.

Simultaneously, the starter—generator arrangement 14 is acted upon so that it maintains the internal-combustion engine for two crankshaft revolutions at the rotational speed which existed when the "ignition off" signal was received. In this time period, the unburnt gas quantities still existing in the intake system and the combustion spaces are now burnt without residue.

After the two crankshaft revolutions, the starter—generator arrangement 14 stops the internal-combustion engine 10 as fast as possible.

As an alternative, this shut down operation may take place by means of a defined rotational speed or torque sequence.

Figure 2:
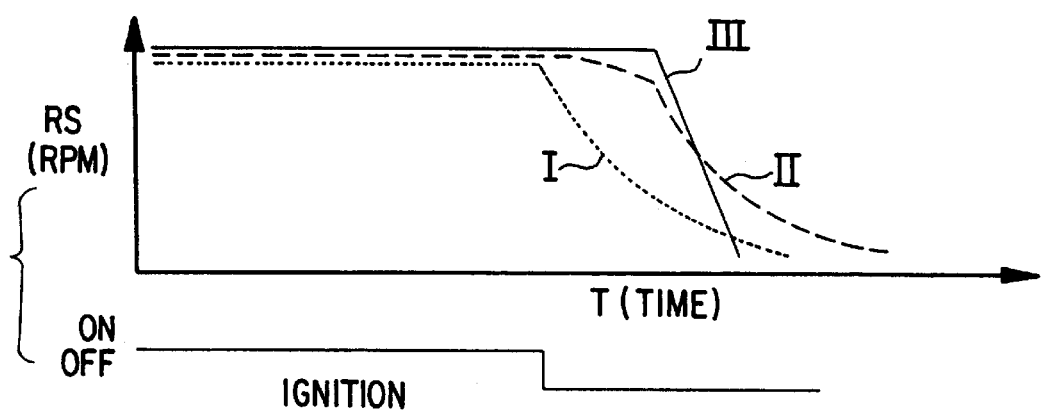
FIG. 2 is a diagram which compares the rotational speed course of the engine during a shut-off according to the present invention and in the case of the prior art.

FIG. 2 shows an effect caused by the invention. In the upper part of FIG. 2, engine rotational speed RS is depicted as a function of time T. The rotational engine speed sequence in the case of a conventional shut-off operation is shown by a frequently broken line I. When the ignition is switched to "off" (compare lower part of the diagram which shows the ignition switch position as a function of time T), the rotational engine speed is reduced corresponding to the moment of inertia of the engine. If the residual gases in the combustion spaces and the intake system are still to be burnt, this results in an "afterdieseling effect", which is shown by the long broken lines II. This leads to an undefined shut-off operation.

By means of the above-described invention, a rotational speed sequence can be achieved which is illustrated by means of the solid line III in FIG. 2. For a certain time period or a certain number of crankshaft revolutions after the "ignition off" signal, the rotational engine speed is still maintained. Then the rotational engine speed drops abruptly, and, in a defined manner, earlier than in the case of the conventional shut-off operations—, the stoppage of the internal-combustion engine is achieved.

In preferred embodiments, the time period for maintaining rotational engine speed after "ignition off" is between 50 to 500 ms (milliseconds), and preferably about 200 ms.

On the whole, the method according to the invention ensures a reproducible shut-off action and low pollutant emission values. In addition, it should be pointed out that, as the result of the fast braking of the internal-combustion engine, the energy consumption for the prolongation of the idling rotational speed phase, caused by the holding of the rotational speed, is compensated. In addition, it is possible to rapidly pass through possibly existing resonance points below the idling rotational speed.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. Method for the controlled shutting-off of an internal-combustion engine, which has a fuel injecting timing gear and an ignition control, and an electric machine in the form of one of a motor and a generator which is coupled directly or indirectly with the internal-combustion engine, said method comprising:
    detecting a shut-off signal for the internal-combustion engine,
    interrupting the fuel injection while simultaneously maintaining the ignition in response to the shut-off signal,
    maintaining a defined rotational engine speed for a defined time period or a defined number of crankshaft revolutions after the shut-off signal by means of the electric machine, and
    subsequently stopping the internal-combustion engine by means of the electric machine.

2. Method according to claim 1, wherein the time period for which the defined rotational speed of the internal-combustion engine is maintained is 50 to 500 ms.

3. Method according to claim 2, wherein the time period for which the defined rotational speed of the internal-combustion engine is maintained is 200 ms.

4. Method according to claim 2, wherein the stopping takes place with a predetermined rotational speed or torque sequence.

5. Method according to claim 3, wherein the stopping takes place with a predetermined rotational speed or torque sequence.

6. Method according to claim 1, wherein the defined number of crankshaft revolutions for which the defined rotational speed of the engine is maintained corresponds to between 1 to 4 crankshaft revolutions.

7. Method according to claim 6, wherein about 2 crankshaft revolutions are selected.

8. Method according to claim 6, wherein the stopping takes place with a predetermined rotational speed or torque sequence.

9. Method according to claim 7, wherein the stopping takes place with a predetermined rotational speed or torque sequence.

10. Method according to claim 1, wherein the stopping takes place with a predetermined rotational speed or torque sequence.

11. System for the controlled shutting-off of an internal-combustion engine having a fuel injection timing gear, an ignition control as well as an electric machine in the form of an electric motor and/or generator coupled directly or indirectly with the internal-combustion engine, and a control unit,
    wherein the control unit is constructed for recognizing the ignition signal,
    wherein the control unit is connected with the fuel injection timing gear and the ignition control and is constructed for interrupting, when an ignition-off signal is detected, the fuel injection while simultaneously maintaining the ignition, and
    wherein the control unit is connected with the electric machine in order to continue to operate the internal-combustion engine after the ignition-off signal first at a defined rotational speed and subsequently to stop the engine with a defined torque sequence.

12. System according to claim 11, wherein the electric machine is a starter and/or generator, particularly a crankshaft starter-generator.

13. An engine system assembly comprising:
    an internal combustion engine having a rotating crankshaft,
    an electric machine operably coupled to the engine,
    an ignition switch operable to control ignition current to the engine,
    a fuel injecting system operable to supply fuel to the engine, and
    a control unit operable to automatically control shut down of the engine by carrying out the following steps:
        detecting a shut-off signal for the internal-combustion engine,
        interrupting the fuel injection while simultaneously maintaining the ignition in response to the shut-off signal,
        maintaining a defined rotational engine speed for a defined time period or a defined number of crankshaft revolutions after the shut-off signal by means of the electric machine, and
        subsequently stopping the internal-combustion engine by means of the electric machine.

14. An engine system according to claim 13, wherein the electric machine is a motor.

15. An engine system according to claim 13, wherein the electric machine is a crankshaft connected starter-generator.

16. An engine system according to claim 13, wherein the time period for which the defined rotational speed of the internal-combustion engine is maintained is 50 to 500 ms.

* * * * *